(12) United States Patent
Bhatia et al.

(10) Patent No.: US 6,535,798 B1
(45) Date of Patent: Mar. 18, 2003

(54) THERMAL MANAGEMENT IN A SYSTEM

(75) Inventors: Rakesh Bhatia, San Jose, CA (US);
Dennis Reinhardt, Palo Alto, CA (US);
Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/204,530

(22) Filed: Dec. 3, 1998

(51) Int. Cl.$^7$ .............................................. G05D 23/00
(52) U.S. Cl. ........................... 700/293; 700/12; 700/14; 700/22; 700/81; 700/299; 700/298; 713/132; 713/392; 713/340; 713/400; 713/500; 713/601; 327/113; 327/512; 327/513; 327/530
(58) Field of Search ........................... 700/299, 12, 13, 700/14, 16, 21, 22, 79, 80, 81, 82, 291–298; 327/113, 513, 512, 538, 544, 530; 713/132, 322–324, 340, 400, 500, 600–601

(56) References Cited

U.S. PATENT DOCUMENTS

| | | | | |
|---|---|---|---|---|
| 4,656,612 A | * | 4/1987 | Allan | 327/258 |
| 4,716,551 A | * | 12/1987 | Inagaki | 327/187 |
| 5,278,796 A | * | 1/1994 | Tillinghast et al. | 365/211 |
| 5,623,647 A | * | 4/1997 | Maitra | 709/100 |
| 5,745,375 A | * | 4/1998 | Reinhardt et al. | 702/1 |
| 5,760,636 A | | 6/1998 | Noble et al. | 327/513 |
| 5,825,674 A | * | 10/1998 | Jackson | 713/321 |
| 5,909,696 A | * | 6/1999 | Reinhardt et al. | 711/141 |
| 5,953,685 A | * | 9/1999 | Bogin et al. | 702/132 |
| 5,983,356 A | * | 11/1999 | Pandey et al. | 713/322 |
| 5,999,730 A | * | 12/1999 | Lewis | 717/2 |
| 6,006,169 A | * | 12/1999 | Sandhu et al. | 702/132 |
| 6,014,051 A | * | 1/2000 | Little | 327/291 |
| 6,021,076 A | * | 2/2000 | Woo et al. | 365/211 |
| 6,029,006 A | * | 2/2000 | Alexander et al. | 713/500 |
| 6,029,119 A | * | 2/2000 | Atkinson | 702/132 |
| 6,047,248 A | * | 4/2000 | Gergiou et al. | 702/132 |
| 6,058,012 A | * | 5/2000 | Cooper et al. | 361/704 |
| 6,112,164 A | * | 8/2000 | Hobson | 702/132 |
| 6,140,860 A | * | 10/2000 | Sandhu et al. | 327/513 |
| 6,158,012 A | * | 12/2000 | Watts, Jr. | 713/322 |
| 6,173,217 B1 | * | 1/2001 | Bogin et al. | 700/153 |
| 6,216,234 B1 | * | 4/2001 | Sager et al. | 713/501 |
| 6,172,611 B1 | * | 6/2001 | Hussain et al. | 340/584 |

OTHER PUBLICATIONS

Intel et al., *Advanced Configuration and Power Interface Specification*, Rev. 1.0, Dec. 22, 1996, pp. 4–54–4–59, 12–172–12–180.

* cited by examiner

*Primary Examiner*—Ramesh Patel
(74) *Attorney, Agent, or Firm*—Trop, Pruner & Hu, P.C.

(57) ABSTRACT

A system including a component (e.g., a processor) with a clock and a thermal management controller that monitors a temperature in the system. The thermal management controller varies the component between different performance states (e.g., cycles the processor between a high and a low performance state) when an over-temperature condition is detected. The thermal management controller further throttles the clock of the component while in the low performance state until the over-temperature condition is removed.

41 Claims, 14 Drawing Sheets

THERMAL MANAGEMENT IN A SYSTEM

BACKGROUND

The invention relates to thermal management in a system.

Different types of power and thermal management techniques have been implemented in systems. A simple system includes a sensor that detects for an over-temperature condition and generates an interrupt to cause the computer system to shut down or otherwise go into a low power state (typically by deactivating components) when the over-temperature condition is detected. Another more sophisticated technique is defined by the Advanced Configuration and Power Interface (ACPI) Specification, Rev. 1.0, published on Dec. 22, 1996, that provides an interface between the operating system of a system and hardware devices to implement power and thermal management.

The ACPI specification defines several thresholds that indicate temperatures at which different levels of software-controlled thermal management activities are performed. Three primary cooling policies are defined in the ACPI specification: passive cooling (in which the operating system reduces the power consumption of the system by throttling the processor clock); active cooling (in which the system expends energy to reduce power by taking a direct action such as turning on a fan or remote heat exchanger); and critical trip control (in which a threshold temperature has been reached at which the operating system performs a critical shutdown of the system).

Passive cooling as defined in the ACPI specification involves a type of thermal management known as throttling of one or more central processing units (CPUs). Under ACPI, the operating system (OS) can program varying CPU clock duty cycles so that the power dissipation of the CPU matches the power dissipation capabilities of the system. To accomplish throttling, clocks in the CPUs are enabled and disabled according to the defined duty cycle.

According to the ACPI specification, two execution states are defined for the CPU, one a full speed state and one a throttled state (in which the CPU clocks are active only a programmed percentage of the time). While in the throttled state, the CPU's clock is stopped a programmed percentage of the time, which may reduce overall system performance if the CPU remains in the throttled state for an extended period of time for system temperature control.

A need thus arises for a thermal management technique that is capable of maintaining system performance at a relatively high level.

SUMMARY

In general, according to an embodiment, a system includes a component having a clock and a thermal management controller adapted to vary the component between performance states including a lower performance state when the controller detects a first condition, the controller adapted to throttle the clock while the component is in the lower performance state.

Other features will become apparent from the following description and from the claims.

DETAILED DESCRIPTION

Figure 1:
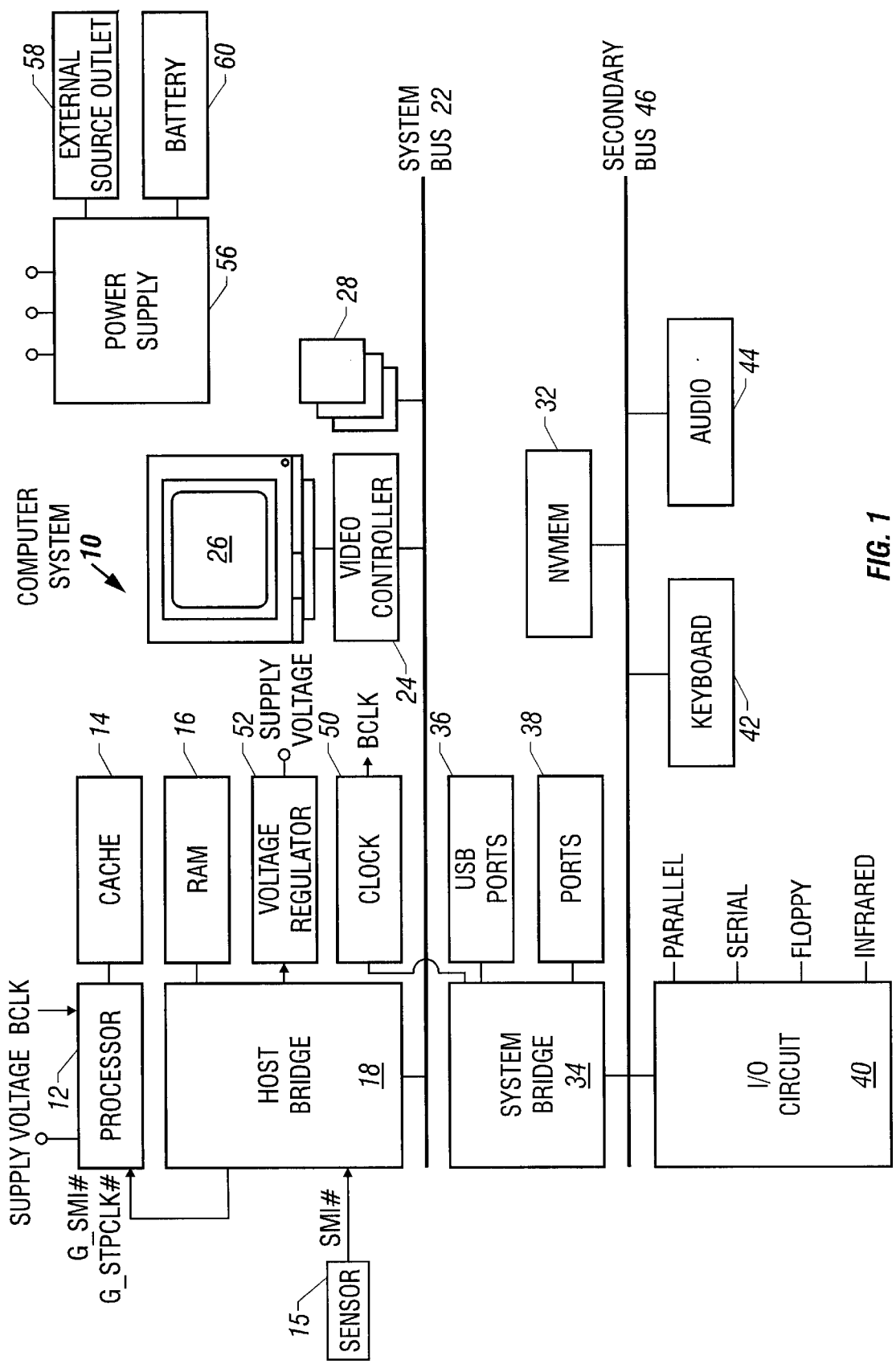
FIG. 1 is a block diagram of a system according to an embodiment of the invention.

A system according to an embodiment of the invention implements a thermal management scheme in which one or more system components are switched between different levels (two or more) of performance states in response to over-temperature conditions or other conditions. The thermal management scheme is performed by a thermal management controller that may include one or more layers including software, firmware, and hardware. Example components may include general or special-purpose processors such as microprocessors, microcontrollers, application-specific integrated circuits (ASICs), programmable gate arrays (PGAs), peripheral device controllers, and other types of devices. In one embodiment, one low performance state is defined along with a high performance state, and optionally, one or more intermediate performance states. A performance state may be characterized by component core and bus clock speeds and component supply voltage levels. In the embodiments described below, one high performance (HP) state and one low performance (LP) state are defined, although additional higher or lower performance states may also be defined.

In the HP state, a processor's (or other component's) core clock frequency and voltage level may be at one setting, while in the LP state, the processor's core clock frequency and voltage level may be at a lower setting. The thermal management scheme is designed to increase the amount of time the processor (or other component) is operating in the HP state. The processor (or other component) spends a programmed percentage of time in the LP state (throttled or non-throttled) and the rest of the time in the HP state. This is referred to as cycling between the HP and LP states when an over-temperature condition exists. The cycling effectively delivers a level of performance and power consumption that lies between the two operating points. For any given power dissipation capability of the computer system, cycling the one or more components between the HP and LP states may provide a performance level that is superior to the performance provided by throttling the components from the HP state, as described further below.

According to another feature of an embodiment of the invention, once the system has transitioned to the LP state, throttling of the processor (or other component) from the LP state may be performed to further reduce the processor's (or other component's) power consumption and to lower system temperature below a target temperature. Thus, effectively, the thermal management scheme according to one embodiment first cycles or varies the processor (or other component) between or among different performance states. If needed, throttling from a reduced power state such as the LP state is performed. By efficiently throttling the processor (or other component) from the LP state rather than from the HP state, a high level of system performance may be obtained while at the same time maintaining system temperatures below preset thresholds.

Alternatively, if more than two performance states are available, the processor may be transitioned among the different performance states, with throttling being performed from any of the performance states if necessary.

In one embodiment, the thermal management may be performed in an ACPI environment. It is to be understood, however, that other power or thermal management schemes may also be used to achieve thermal management while maintaining a relatively high level of system performance. In the following description, reference is made to a thermal management embodiment in which the state of a processor is varied—it is contemplated that the states of other components may be varied in further embodiments.

Referring to FIG. 1, an example system 10 according to an embodiment of the invention includes one or more processors 12 to provide a uni-processor or a multi-processor system. The system may include a general- or special-purpose computer, a microprocessor- or microcontroller-based system, a hand-held computing device, a set-top box, an appliance, a game system, or any controller-based device in which the controller may be programmable such as an ASIC or PGA. One or more temperature sensor units 15 monitor system temperature in one or more corresponding thermal zones, each capable of issuing an interrupt, e.g., a system management interrupt (SMI), a system controller interrupt (SCI), or some other notification when a sensed temperature rises above a preset target temperature $T_t$ or falls below the target temperature $T_t$. Furthermore, to effect the thermal management scheme according to an embodiment of the invention, periodic interrupts are generated to indicate if the sensed temperature remains below or above the target temperature $T_t$. Alternatively, a device driver or other software or firmware layer or module may be used to monitor the monitored temperature and to generate thermal management interrupts when appropriate.

In one embodiment, when the monitored temperature is above $T_t$, a thermal engage SMI is generated. On the other hand, when the monitored temperature is below $T_t$, a thermal disengage SMI is generated. While the monitored temperature remains above or below $T_t$, the thermal engage or disengage SMI may be generated at periodic intervals to allow software or firmware to manage the performance level of the processor. Either SMI invokes an SMI handler that controls the cycling of the processor 12 between the HP and LP states and throttling of the processor 12 from the LP state. Alternatively, thermal management may be performed by another software or firmware module.

In alternative embodiments, other components (e.g., bridge controller chips, peripheral controllers) in the system may be transitioned between or among the different performance states as well as throttled for system thermal management. In addition, thermal management in the system 10 may be performed independently for multiple thermal zones.

In FIG. 1, the interrupt event generated by the temperature sensor unit 15 may be routed directly to the processor 12 or to a host bridge 18 coupled between the processor 12 and a system bus 22, which may in one embodiment be a Peripheral Component Interconnect (PCI) bus, as defined in the PCI Local Bus Specification, Production Version, Revision 2.1, published on Jun. 1, 1995. Alternatively, the interrupt event may be stored as a memory or I/O-mapped register bit that is polled by a software or firmware module.

To perform throttling, a clock control input (such as the stop clock input illustrated as G_STPCLK# in FIG. 1 to an 80×86 or Pentium® family processor from Intel Corporation) is activated and deactivated according to a preset duty cycle. The signal G_STPCLK# is generated by thermal management control logic and routed to the STPCLK# input pin of processors made by Intel for example. The STPCLK# internally gates clocks to the core of these processors. Activation of the clock control input (by driving G_STPCLK# low, for example) causes the processor 12 to enter a significantly reduced power mode (e.g., stop grant state or the C2 state defined by the ACPI specification) in which an internal clock of the processor is stopped and most functions are disabled. Throttling is thus accomplished by activating the clock control input a certain percentage of the time to disable processor activity while allowing processor activity the rest of the time.

Other components of the system 10 include a clock generator 50 that generates a host clock BCLK to the processor 12 and a voltage regulator 52 that regulates the supply voltage of the processor 12. In one embodiment, the clock generator 50, processor 12, and voltage regulator 52 are controllable to transition the computer system 10 between or among different performance states, including the HP and LP states. For example, the core clock frequency and core voltage level of the processor 12 may be reduced in the LP state and increased in the HP state. Significant power consumption reduction may be achieved in the LP state as component power consumption is proportional to the clock frequency and to the square of the supply voltage. Thus, in embodiments of the invention, thermal management occurs both in the non-linear and linear regions. Varying between the HP and LP states causes power consumption to vary non-linearly as power consumption is proportional to the clock frequency and to the square of the voltage. Further throttling from the LP state causes a linear reduction in power consumption.

A cache memory 14 is coupled to the processor 14 and system memory 16 is controlled by a memory controller in the host bridge 18. The system bus 22 may be coupled to other components, including a video controller 24 coupled to a display 26 and peripheral devices coupled through slots 28. A secondary or expansion bus 46 is coupled by a system bridge 34 to the system bus 22. The system bridge 34 may include interface circuits to different ports, including a universal serial bus (USB) port 36 (as described in the Universal Serial Bus Specification, Revision 1.0, published in January 1996) and mass storage ports 38 that may be coupled to mass storage devices such as a hard disk drive, compact disc (CD) or digital video disc (DVD) drives, and the like.

Other components coupled to the secondary bus 46 may include an input/output (I/O) circuit 40 connectable to a parallel port, serial port, floppy drive, and infrared port. A non-volatile memory 32 for storing BIOS routines may be located on the bus 46, as may a keyboard device 42 and an audio control device 44. The main power supply voltages in the system 10 are provided by a power supply circuit 56 that is coupled to a battery 60 and an external power source outlet 58. Reference to specific components in the system 10 are for illustrative purposes—it is to be understood that other embodiments of the system 10 are possible.

Various software or firmware layers (formed of modules or routines, for example), including applications, operating system modules, device drivers, BIOS modules, and interrupt handlers, may be stored in one or more storage media in the system. The storage media includes the hard disk drive, CD or DVD drive, floppy drive, non-volatile memory, and system memory. The modules, routines, or other layers stored in the storage media contain instructions that when executed causes the system 10 to perform programmed acts.

The software or firmware layers can be loaded into the system 10 in one of many different ways. For example, code segments stored on floppy disks, CD or DVD media, the hard disk, or transported through a network interface card, modem, or other interface mechanism may be loaded into the system 10 and executed as corresponding software or firmware layers. In the loading or transport process, data signals that are embodied as carrier waves (transmitted over telephone lines, network lines, wireless links, cables, and the like) may communicate the code segments to the system 10.

In the thermal management scheme according to an embodiment of the invention, various parameters are defined to calculate the effective system performance due to cycling between the HP and LP states. A parameter x represents the fraction of time the processor 12 spends in the LP state and 1−x represents the fraction of time the processor 12 spends in the HP state. Given that $P_L$ represents the power dissipation of the processor 12 in the LP state and $P_H$ is the power dissipation of the processor in the HP state, the effective power dissipation capability $P_{eff}$ is determined by Eq. 1, provided that the transition time between the HP and LP states may be assumed to be negligible.

$$P_{eff}=(P_L \cdot x)+P_H \cdot (1-x). \quad \text{(Eq. 1)}$$

If the value of $P_{eff}$ is equated to the power that can be dissipated by the computer system, then x (the fraction of time spent in the LP state) is determined according to Eq. 2.

$$x = \frac{P_H - P_{eff}}{P_H - P_L}. \quad \text{(Eq. 2)}$$

If $f_L$ is the theoretical performance of the processor 12 in the LP state and $f_H$ is the theoretical performance in the HP state (both expressed in frequency), then the effective theoretical processor performance $f_{cycle}$ from the cycling scheme according to thermal management of the described embodiment in which the processor 12 is cycled between the LP and HP states is determined according to Eq. 3.

$$f_{cycle} = x \cdot f_L + (1-x) \cdot f_H = \frac{f_L \cdot (P_H - P_{eff})}{P_H - P_L} + \frac{f_H \cdot (P_{eff} - P_L)}{P_H - P_L}. \quad \text{(Eq. 3)}$$

As an example, if $P_L$ is 8 watts (W), $f_L$ is 500 megahertz (MHz), $P_H$ is 16 W, $f_H$ is 700 MHz, and $P_{eff}$ is 14 W, the fraction of time to be spent by the processor in the LP state is calculated according to Eq. 2 as:

$$x = \frac{16W - 14W}{16W - 8W} = 0.25.$$

From this, the effective processor performance $f_{cycle}$ achieved by cycling between the HP and LP states is calculated according to Eq. 3 as:

$$f_{cycle}=0.25\times500 \text{ MHz}+0.75\times700 \text{ MHz}=650 \text{ MHz}.$$

To calculate the effective performance $f_{throt}$ that may be achieved due to throttling the processor directly from the HP state (no cycling performed between HP and LP states) in response to an over-temperature condition, a parameter y is defined as the throttling duty cycle (the percentage of time that the processor is active). The effective power dissipation capability $P_{eff}$ from throttling is thus $$P_{eff}=y \cdot P_H, \quad \text{(Eq. 4)}$$

from which $$y = \frac{P_{eff}}{P_H}. \quad \text{(Eq. 5)}$$

The effective performance $f_{throt}$ is thus calculated as $$f_{throt} = y \cdot f_H = \frac{P_{eff}}{P_H} \cdot f_H. \quad \text{(Eq. 6)}$$

Given the same conditions as for the cycling example, $f_{throt}$ is calculated as $$f_{throt} = \frac{14W}{16W} \times 700 \text{ MHz} = 612.5 \text{ MHz}.$$

Comparing $f_{cycle}$ and $f_{throt}$ as calculated above, the delivered performance of the processor for the cycling case is greater than that for throttling at any given $P_{eff}$ that is between $P_H$ and $P_L$. Thus, cycling between the HP and LP states according to some embodiments of the invention may deliver a level of performance that is superior than that of throttling from the HP state in response to an over-temperature condition.

If cycling the processor does not result in the desired temperature control, throttling is further performed from the LP state, which reduces the processor's effective performance $f_{cycle}$ by a value based on the duty cycle of the throttling.

Using the thermal management scheme according to an embodiment of the invention, a two-tiered thermal management is performed in which the first tier involves cycling or varying the processor (or other component) between or among different performance states that effectively provides a relatively high performance level. The second tier, performed if the performance state cycling or varying scheme is inadequate, involves throttling the processor from a reduced performance state (such as the LP state) to avoid inefficient throttling from an elevated performance state such as the HP state.

In the described thermal management embodiment, performance state cycling or varying is invoked when the full power consumed by the processor 12 in the HP state can not be dissipated adequately by the computer system. This may happen for several reasons, such as when other components in the system increase their power consumption, which may cause the ambient temperature of the system to rise to a high level. Other reasons may include failure of one or more fans or other heat dissipation devices in the system.

Figure 2:
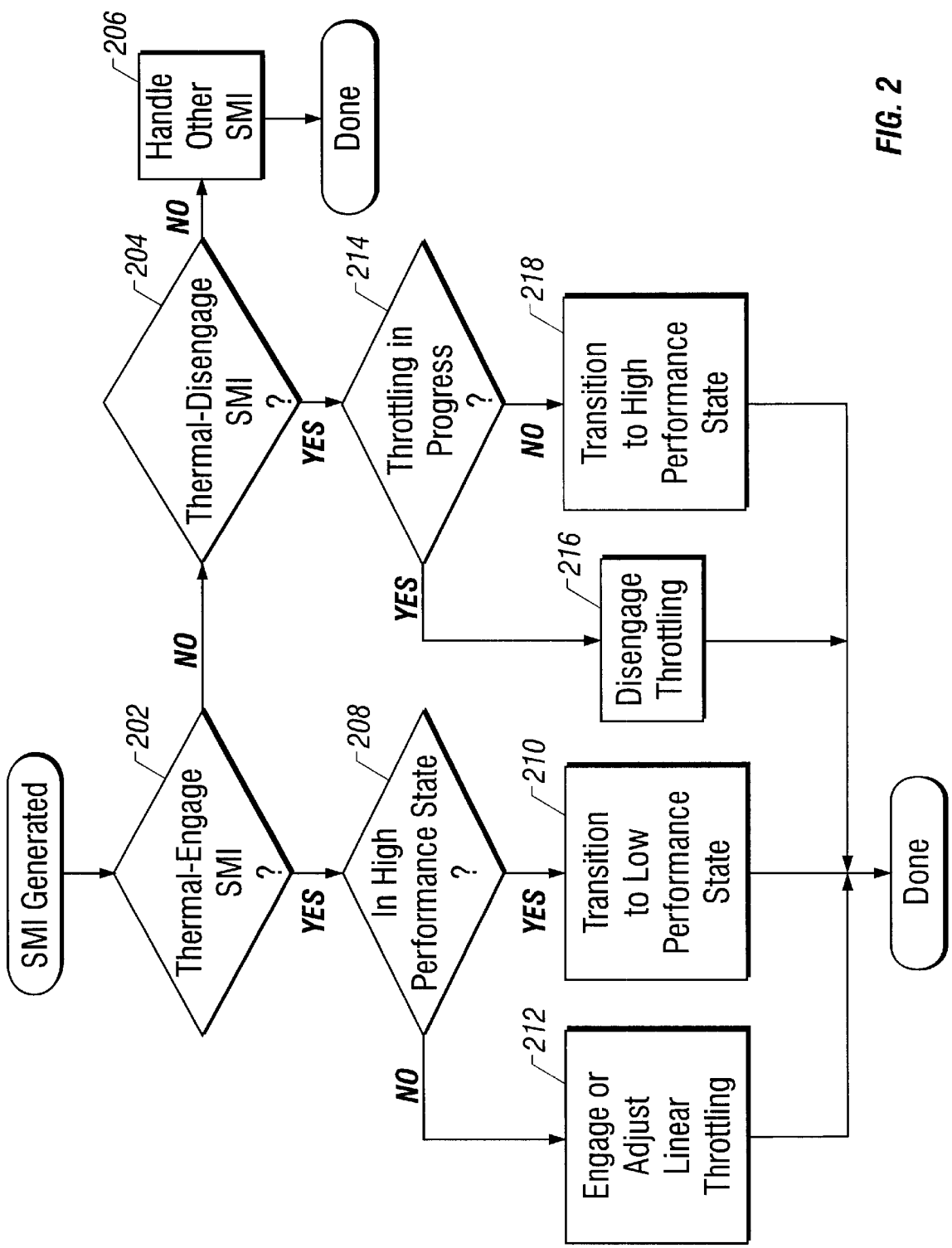
FIGS. 2 and 3 are thermal management routines according to embodiments of the invention.

Referring to FIG. 2, according to one embodiment, portions of a thermal management interrupt routine invoked in response to an SMI event are illustrated. Possible SMI events include a thermal engage SMI (generated when the sampled temperature $T_n$ is greater than $T_t$) and a thermal disengage SMI (generated when the sampled temperature is less than $T_t$). The thermal engage or disengage SMIs are generated at periodic intervals. Further, in one embodiment, once a thermal engage SMI is received, periodic sampling of the system temperature may be performed by the processor 12 by generating periodic interrupts.

Once invoked, the interrupt routine (which in this embodiment is an SMI handler) determines (at 202) if the interrupt event is a thermal engage SMI. If not, it is determined if the interrupt event is a thermal disengage SMI (at 204) or other SMI (at 206). If the interrupt event is a thermal engage SMI, the interrupt routine determines (at 208) the state of the processor 12. If the processor is in the HP state, then the interrupt routine causes the processor to transition to the LP state (at 210). Detection of whether the processor 12 is in the HP or LP state may be accomplished by reading predefined registers in the processor 12 or in other components in the system, including the voltage regulator 52 or system memory 16. The transition between the HP and LP states are described in connection with FIGS. 7–11 below. The SMI handler then exits.

However, if the processor is not in the HP state (as determined at 208), which indicates that the processor 12 is already in the LP state, the interrupt routine incrementally engages throttling of the processor (at 212) to further reduce temperature. The SMI handler then exits. Thus, according to the illustrated embodiment of the invention, throttling of the processor occurs only after the processor has transitioned to the LP state and the temperature $T_n$ still remains above the threshold $T_t$. Each time the SMI handler passes through the throttling task (at 212), the processor throttling is incrementally increased by one setting (that is, the throttling duty cycle is decreased).

If the interrupt event is a thermal disengage SMI (as determined at 202 and 204), which is invoked periodically by another module in the system (e.g., a device driver or hardware controller) when the sampled temperature $T_n$ is less than $T_t$, the interrupt routine determines (at 214) if processor throttling is in progress. If so, processor throttling is disengaged (at 216) incrementally, first by increasing the throttling duty cycle and finally by deactivating G_STPCLK# or other clock control input of the processor 12. The incremental decrease in throttling is performed each time the SMI handler traverses through task 216. However, if throttling is not in progress (as determined at 214), then the processor is transitioned (at 218) to the HP state. After task 216 or 218 is performed, the SMI handler exits.

The interrupt routine effectively steps the processor from a throttled state back to the LP state and finally to the HP, provided $T_n$ does not exceed $T_t$. Thus, as described, the first level of thermal management involves cycling the processor 12 between the HP and LP states while the second level of thermal management invokes throttling of the processor 12 if the cycling is unable to lower $T_n$ below $T_t$.

Figure 3:
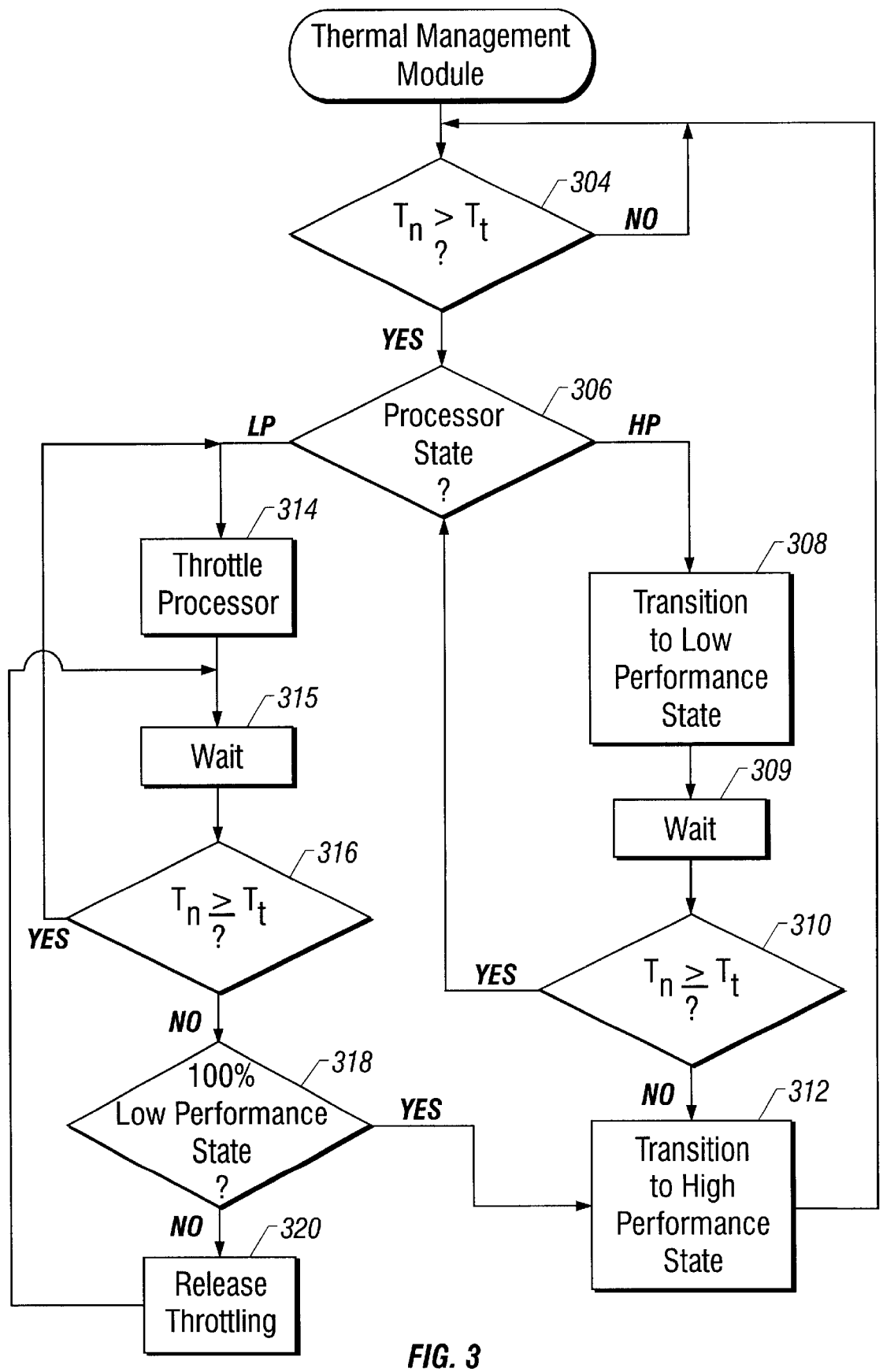

The embodiment of FIG. 2 describes a thermal management scheme implemented with an SMI handler. Alternatively, thermal management in the computer system 10 may be accomplished by other modules including software, firmware, and/or hardware modules. Referring to FIG. 3, according to an alternative embodiment, the thermal management routine may be implemented in another software layer (e.g., an OS module, device driver, BIOS routine). In one example, the thermal management routine invoked may be in response to an ACPI event (e.g., thermal management SCI), which causes the OS to perform thermal management tasks. Thus, the thermal management routine in this example may be under control of the OS.

The thermal management routine, according to the alternative embodiment, periodically samples the system temperature ($T_n$) from the temperature sensor 15, which may contain a memory- or I/O-mapped register value accessible by system software or firmware to poll the sensed temperature. Alternatively, the state of the sensor 15 may be accessible to the processor 12 over a System Management Bus (SMBus), as described in the System Management Bus Specification, Rev. 1.0, published Feb. 15, 1995 by Intel Corporation. In one configuration, an SMBus host controller may be included in the system bridge 34 (e.g., the 82371AB chip from Intel Corporation). If the sampled temperature $T_n$ becomes greater than $T_t$ (as determined at 304), the routine checks (at 306) the state of the processor 12. If the processor is in the HP state, then the processor 12 is transitioned to the LP state (at 308). Next, the routine waits (at 309) a predetermined time period before comparing the next sampled temperature $T_n$ to the target temperature $T_t$. If $T_n$ is less than $T_t$, then the processor is transitioned back to the HP state (at 312).

However, if the sampled temperature $T_n$ is determined (at 310) to be greater than or equal to $T_t$, the routine proceeds to determine (at 306) if the processor is in the LP state, and if so, the routine engages throttling of the processor (at 314). After waiting a predetermined time period (at 315), the routine compares the sampled temperature $T_n$ to $T_t$ (at 316). If $T_n$ continues to be greater than or equal to $T_t$, processor throttling continues (at 314). The throttling duty cycle may be incrementally reduced (to increase throttling) until $T_n$ falls below $T_t$.

However, if the processor throttling is successful in dropping $T_n$ below $T_t$, then the routine checks (at 318) if the throttling duty cycle is at 100% (that is, no throttling is occurring). If so, the routine causes the processor to transition to the HP state (at 312). If processor throttling is occurring, then the routine releases throttling (at 320). Such release may be done incrementally, with the throttling duty cycle incrementally increased until no throttling (100% duty cycle) is occurring. When throttling is completely released, and if $T_n$ remains below $T_t$, then the routine causes the processor to transition to the HP state (at 312).

In some embodiments, processor throttling from the LP state may be accomplished according to the control equation of Eq. 7.

$$\Delta P(\%) = TC1 \cdot (T_n - T_{n-1}) + TC2 \cdot (T_n - T_t), \quad \text{(Eq. 7)}$$

where $\Delta P$ represents the desired incremental percentage drop in performance that results from throttling; $T_n$ is the currently sampled temperature and $T_{n-1}$ is the previously sampled temperature; and TC1 and TC2 are parameters selected empirically according to hardware components used in a system. TC1 is a parameter that allows control based on the change in temperature (difference between $T_n$ and $T_{n-1}$), and TC2 is a parameter that allows control based on the difference between the current temperature $T_n$ and the desired target temperature $T_t$. At one extreme, TC1 can be set to zero and change in performance $\Delta P$ may be completely based on the difference between $T_n$ and $T_t$. According to one embodiment, $\Delta P$ may be set at 12.5% increments.

Based on Eq. 7, the current performance $P_n$ (which can range in value between 0% and 100%) of the system may be calculated according to Eq. 8.

$$P_n = P_{n-1} + HW(-\Delta P), \quad \text{(Eq. 8)}$$

where $P_{n-1}$ is the previous performance level before the performance drop $\Delta P$ and $HW(-\Delta P)$ is a hardware specific mapping function that maps to discrete clock duty cycle settings based on the value of the right hand side of the control equation (Eq. 7). If $P_n$ is 0%, then full throttling is enabled; however, if $P_n$ is 100%, then no throttling is occurring.

If the right hand side of Eq. 7 is negative, indicating that a performance increase should be made, then the value of $HW(-\Delta P)$ is rounded to the next available higher clock duty cycle setting. This causes a decrease in throttling. If, however, the right hand side of Eq. 7 is positive, indicating that a performance decrease should be made, then $HW(-\Delta P)$ is rounded to the next available lower clock duty cycle setting.

A clock duty cycle setting representing the current performance level $P_n$ may be written by a thermal management module (implemented as an interrupt handler, BIOS routine, or device driver, as examples) to a control register (which may be located in the processor or other suitable storage location) to define the percentage of maximum performance desired of the processor 12 (in other words, to define how much processor clock throttling should be performed). The control register is accessible by hardware control logic (which may be implemented in the host bridge 18, for example) to control activation and deactivation of the processor's clock control input (e.g., G_STPCLK#). The number of register bits dedicated to store the clock duty cycle setting determines the number of different duty cycle settings that may be made by the hardware control logic.

Figure 4:
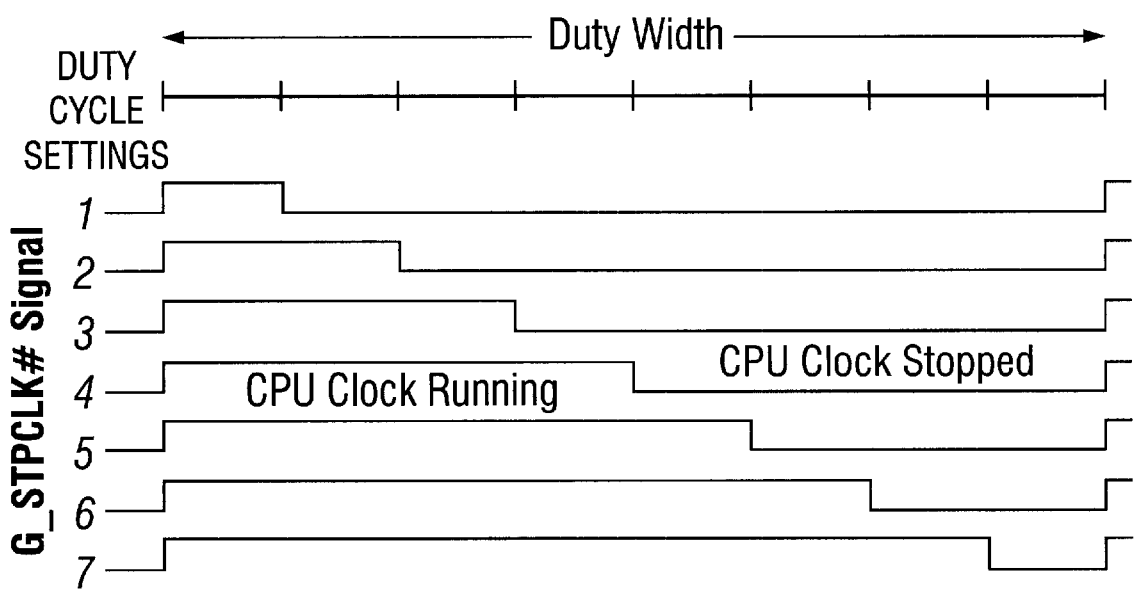
FIG. 4 illustrates duty cycle settings to perform throttling.

For example, as illustrated in FIG. 4, different duty cycle settings (ranging between the value of 1 and 7) specify different duty widths of the clock control input, e.g., G_STPCLK#. When G_STPCLK# is high, the processor clock is active; when low, the processor clock is inactive.

Figure 5:
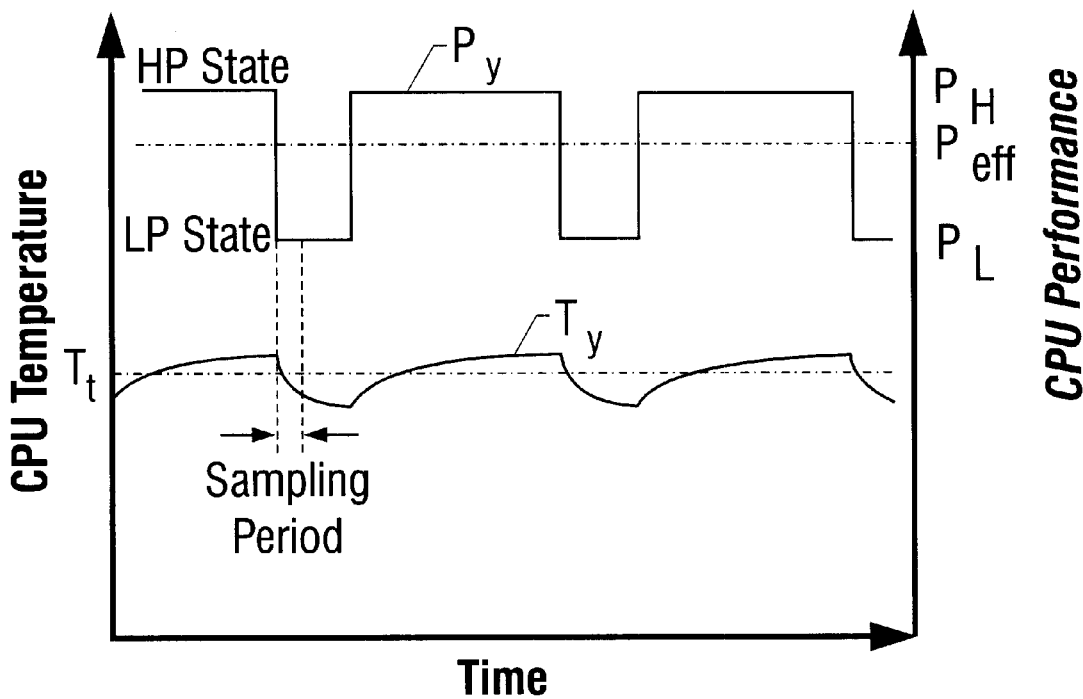
FIGS. 5 and 6 are graphs of power dissipation levels and temperatures in the system of FIG. 1 when performing thermal management according to an embodiment of the invention.

FIG. 5 is a graph illustrating the cycling of power dissipation $P_y$ between the HP and LP levels. The effective power dissipation $P_{eff}$ provided by this thermal management scheme lies between $P_H$ and $P_L$, corresponding to the high and low performance levels, respectively. The temperature graph $T_y$ illustrates the transition of system temperature above and below the target temperature $T_t$ with performance state cycling, with the temperature $T_y$ dropping in the LP state and rising in the HP state.

Figure 6:
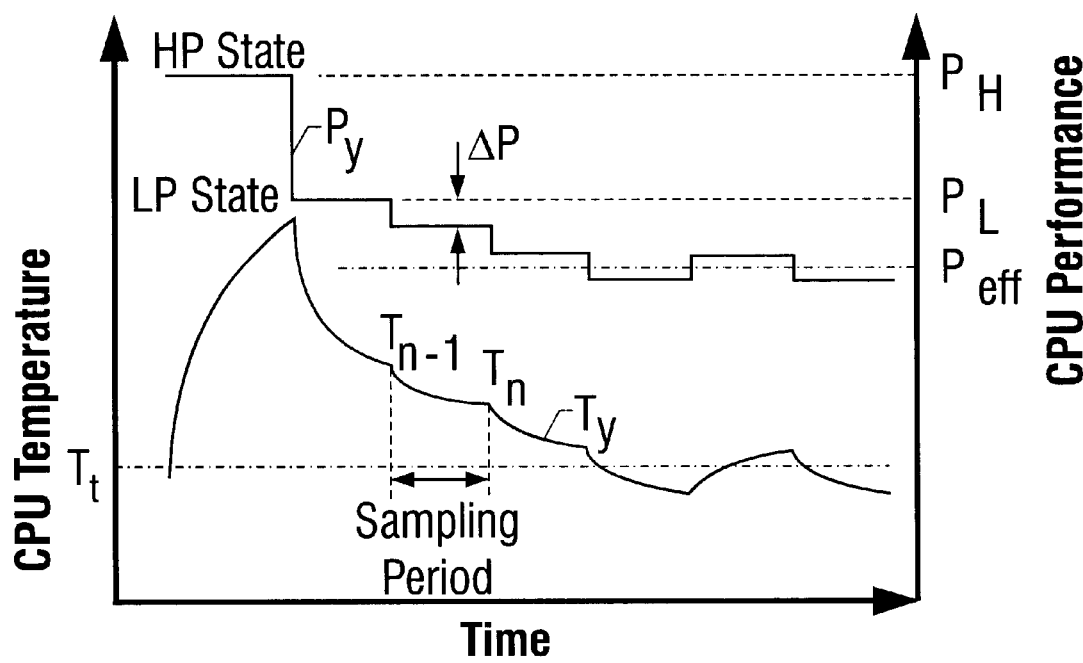

FIG. 6 illustrates the power dissipation $P_y$ as the processor 12 is throttled from the LP state. Throttling does not occur until after the processor has transitioned to the LP state. The reduction in power dissipation is made in decrements of $\Delta P$, as defined by Eq. 7 above.

Figure 12:
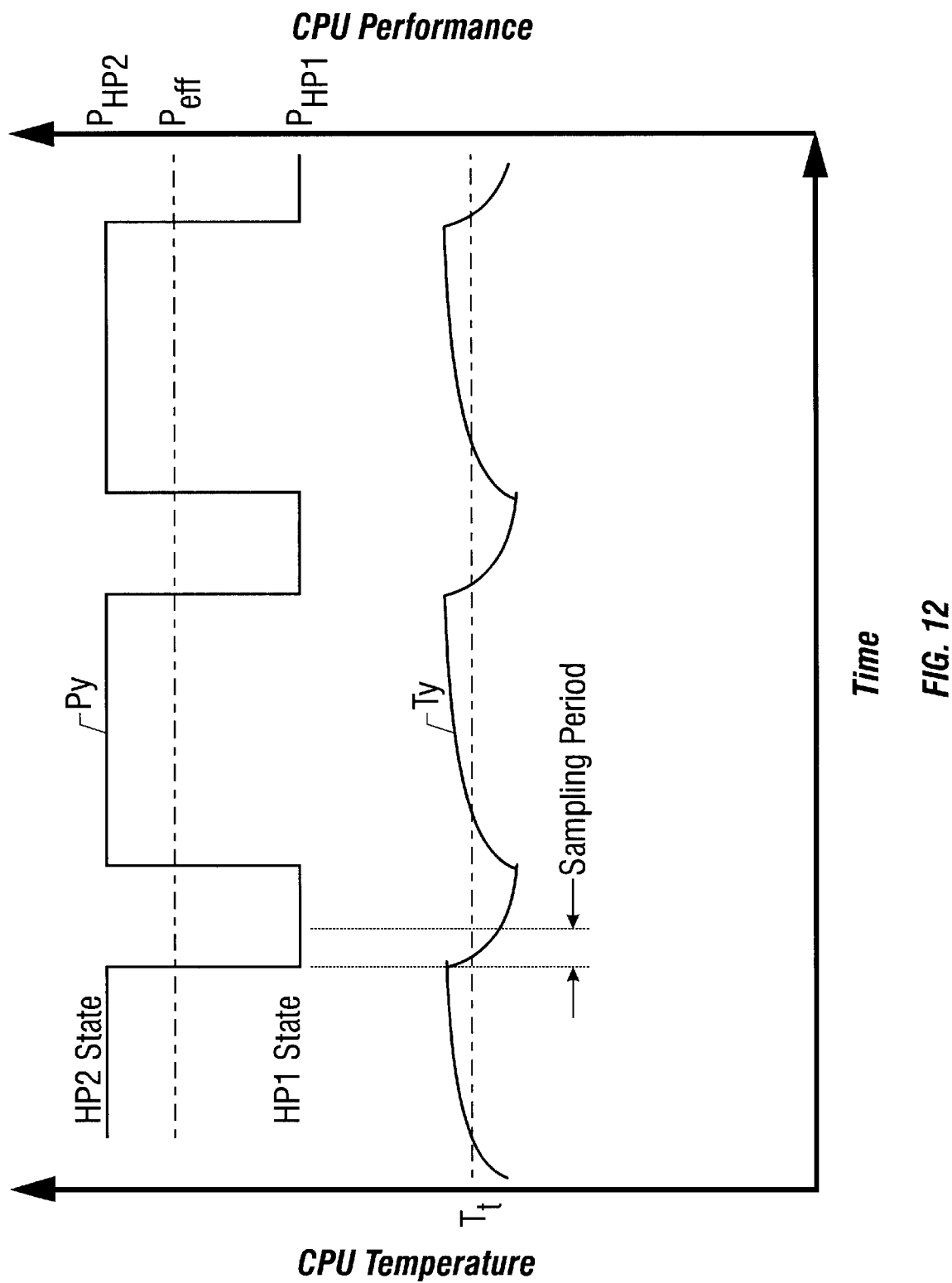
FIGS. 12 and 13 are graphs of power dissipation levels and temperatures in the system of FIG. 1 when performing thermal management according to further embodiments.

In an alternative embodiment, more than two performance states may be defined, including a lower performance (LP) state and two higher performance states, referred to as the HP1 and HP2 states. In this example, the HP2 state has a higher performance level then the HP1 performance state. Referring to FIG. 12, a graph is illustrated of the cycling of the power dissipation $P_y$ between the HP2 and HP1 levels. The effective dissipation $P_{eff}$ provided by this thermal management scheme lies between $P_{HP2}$ and $P_{HP1}$, the HP2 and HP1 power dissipation levels, respectively. The temperature graph $T_y$ illustrates the transition of system temperature above and below the target temperature $T_t$ with performance state cycling, with the temperature $T_y$ dropping in the HP1 state and rising in the HP2 state.

Figure 13:
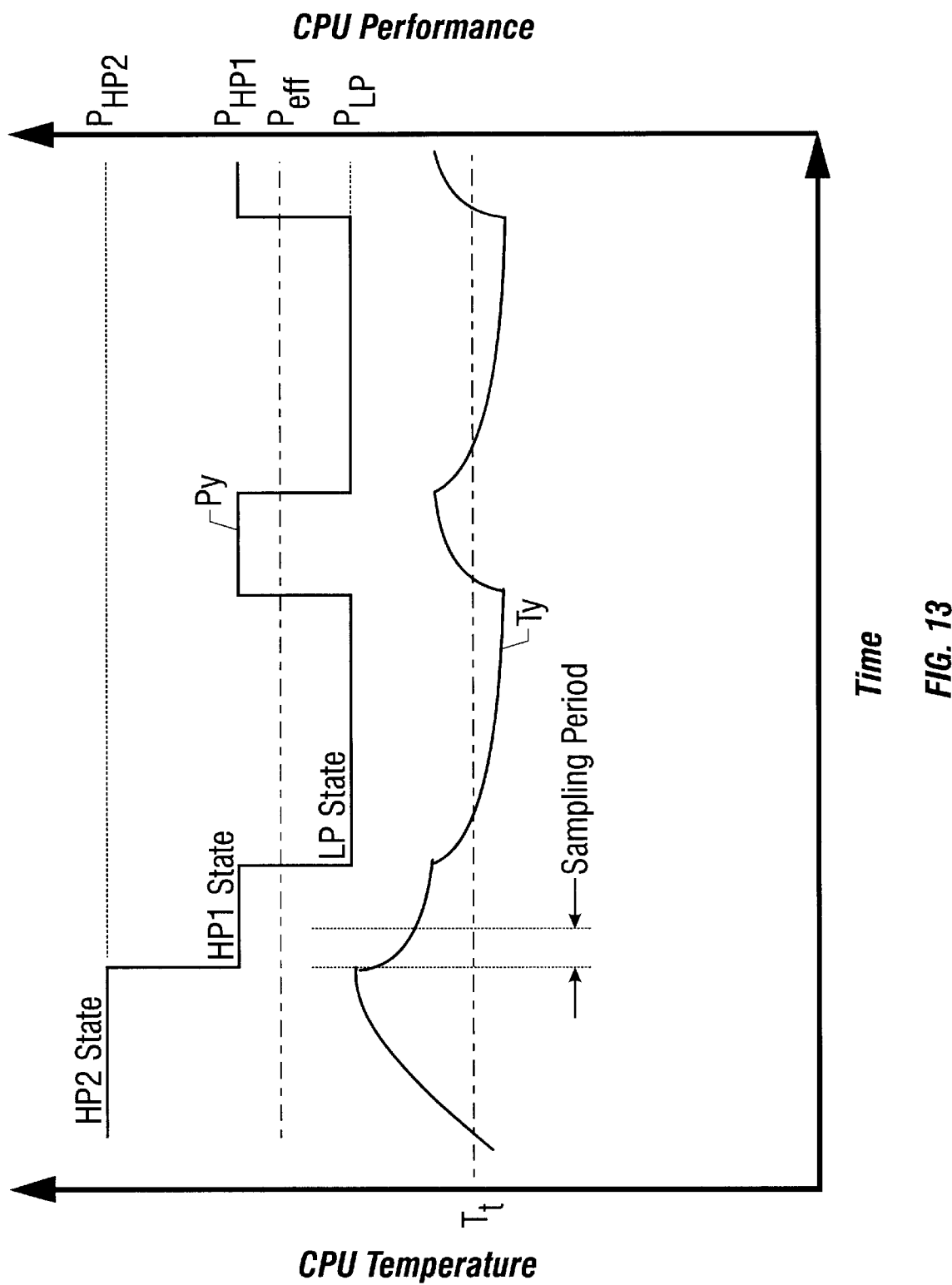

According to the alternative embodiment, throttling may occur either from the HP1 state or from the LP state. FIG. 13 illustrates the power dissipation $P_y$ and the temperature $T_y$ as the processor is throttled from the HP1 state. In response to an over-temperature condition, e.g., the temperature $T_y$ greater than the target temperature $T_t$, the performance state of the processor 12 may be dropped to the HP1 state. If the decline of the temperature $T_y$ does not occur at a satisfactory rate, throttling of the processor 12 may be engaged from the HP1 state. Throttling from the HP1 state may further reduce the temperature $T_y$ below the target temperature $T_t$. The effective power dissipation level $P_{eff}$ when throttling from the HP1 state lies somewhere between $P_{HP1}$ and $P_{LP}$, corresponding to the HP1 and LP performance levels, respectively.

Figure 14:
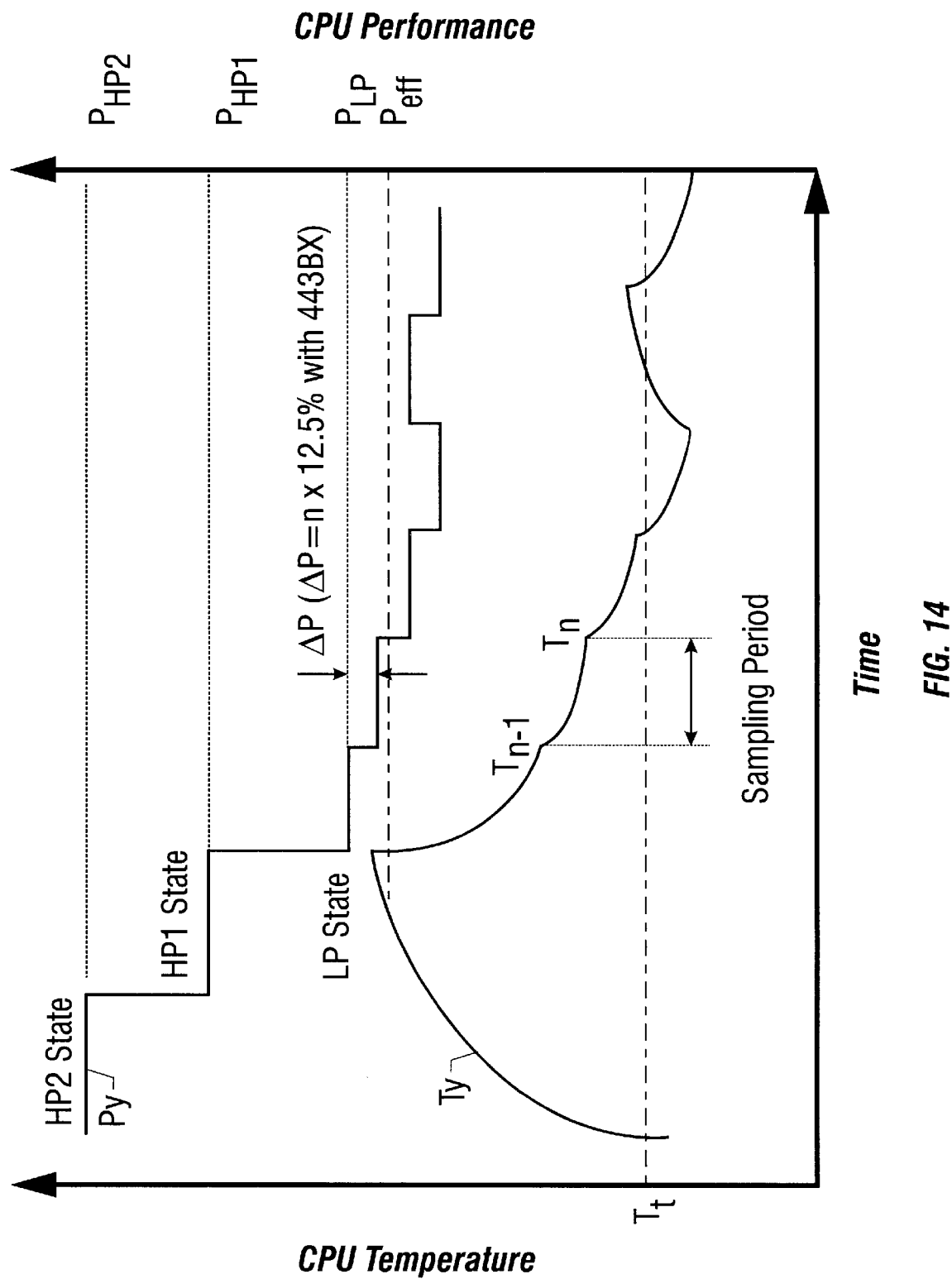
FIGS. 14 & 15 illustrate graphs comparing performance levels of the system of different thermal management schemes.

FIG. 14 illustrates throttling from the LP state according to another embodiment. In this example, if a temperature $T_y$ rises above the temperature $T_t$, the processor 12 is first dropped from the HP2 state to the HP1 state. If the temperature does not drop below the target temperature $T_t$, the processor 12 may further be dropped to the LP state. If further performance level drops are needed to reduce temperature, the processor 12 may then be throttled from the LP state. Again, as with the embodiments of FIGS. 5 and 6, the incremental percentage drop in power dissipation $\Delta P$ may be also according to Eq. 7.

Figure 15:
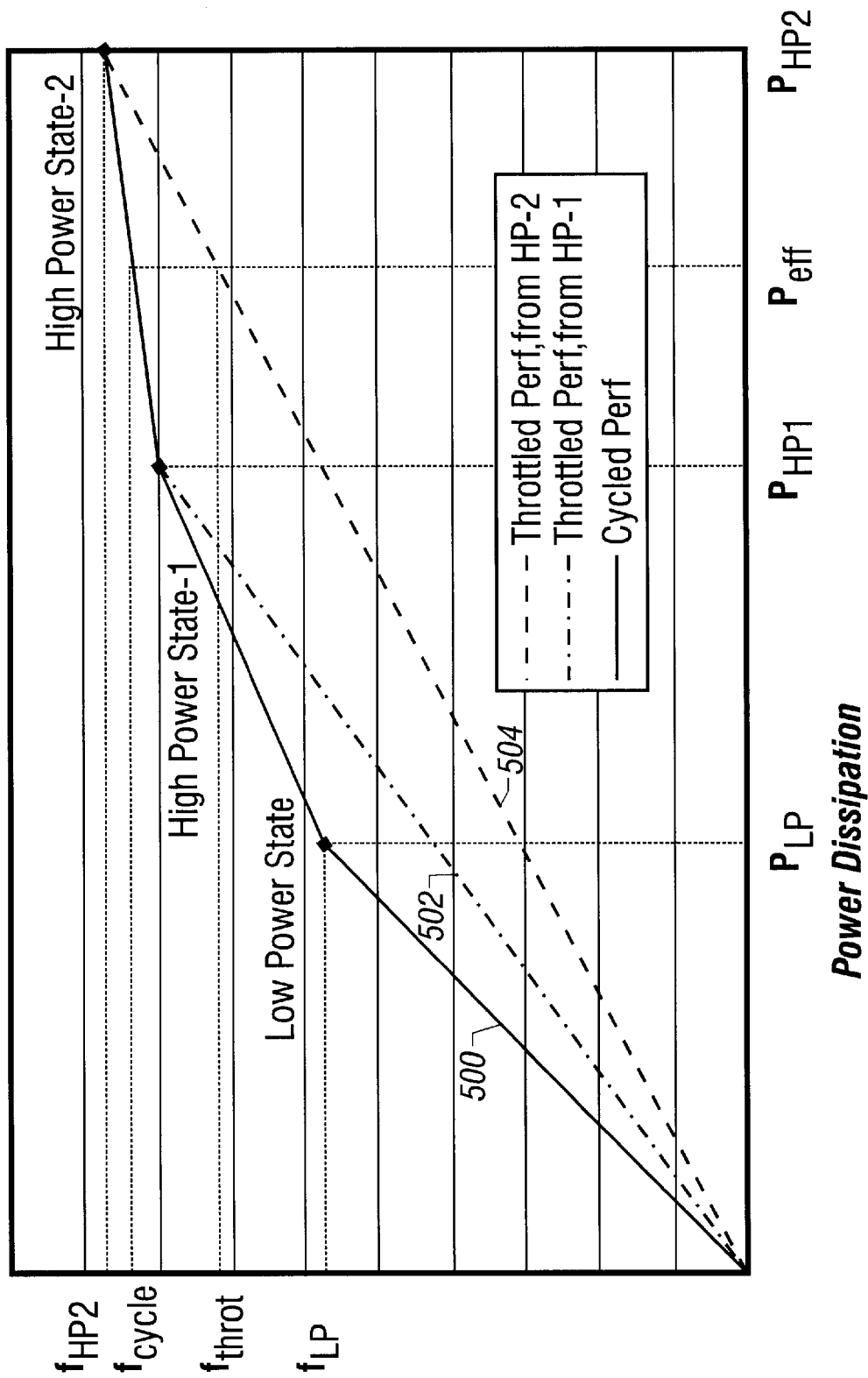

FIG. 15 compares the processor performance using three different types of thermal management. Graph 500 illustrates the delivered performance $f_{cycle}$ when the processor 12 is cycled to vary between the LP, HP1, and HP2 states to perform thermal management. The graph 502 illustrates the delivered performance $f_{throt1}$ for the case in which throttling occurs from the HP1 state. The graph 504 illustrates the delivered performance $f_{throt2}$ for the case where throttling occurs directly from the HP2 state, which is a higher performance state then the HP1 and LP states. Thus, the processor performance is higher for cycled control compared to either of the throttled control cases (throttling from either the HP1 or HP2 states). In addition, throttling from the HP1 state provides a higher delivered performance than the case in which throttling occurs directly from the HP2 state. From the graphs of FIG. 15, the processor performance is higher for cases in which cycling between performance states occurs before throttling compared to the processor performance level of conventional throttling thermal management schemes (in which throttling occurs directly from the highest performance state).

Figure 7:
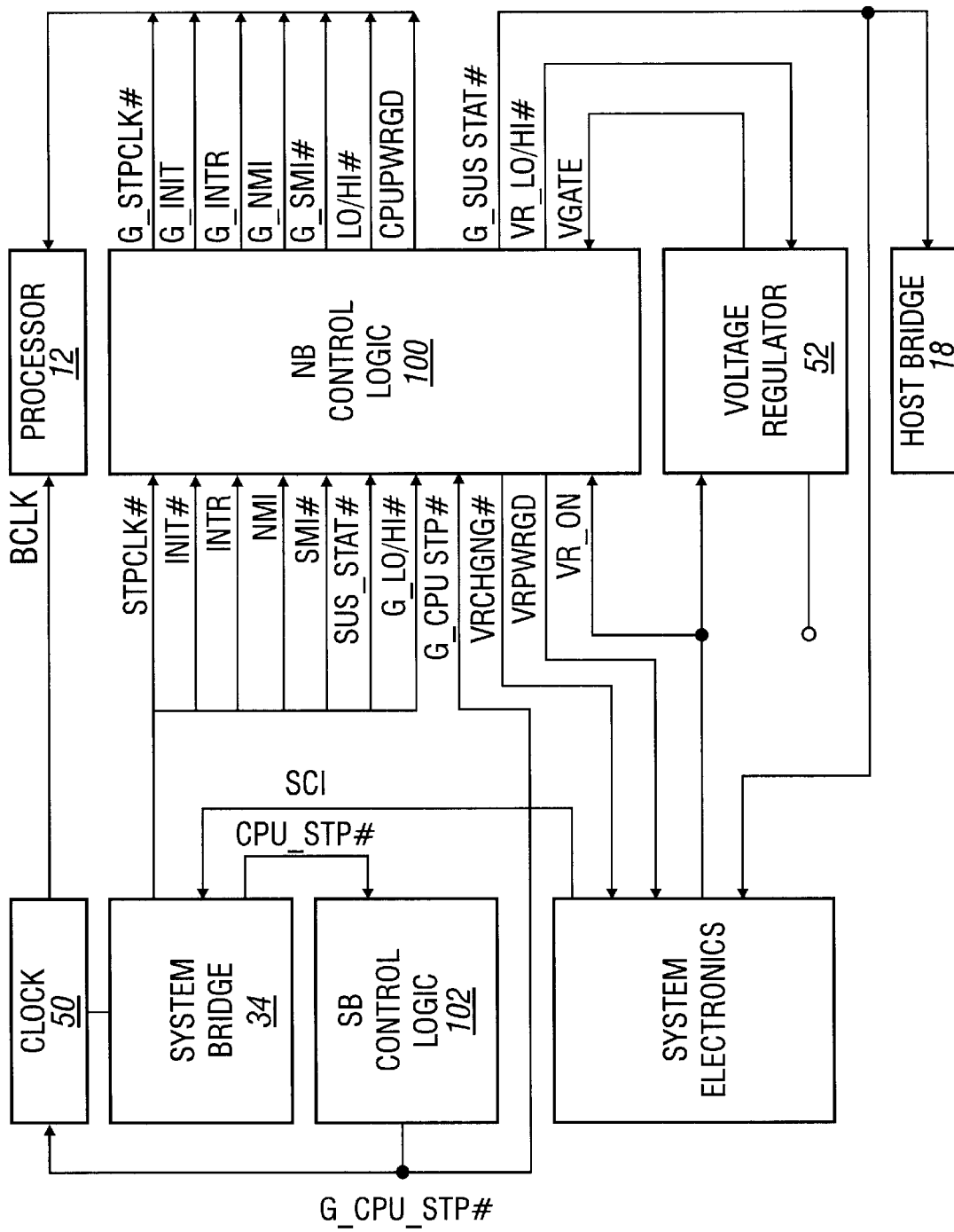
FIG. 7 is a block diagram of power management control logic in the system of FIG. 1.

The following describes the control modules used to transition the computer system between or among performance states. Referring to FIG. 7, power management control logic according to an embodiment of the invention for controlling the core clock frequency and the supply voltage level of the processor 12 is shown. In the illustrated embodiment, the control logic may be separated into a first portion 100 and a second portion 102. However, it is contemplated that the control logic may also be integrated in one component. The first control logic portion 100 may be included in the host bridge 18, and the second control logic portion 102 may be included in the system bridge 34. Alternatively the first and second control logic portions may be implemented as separate chips.

In addition, instead of being configured with host and system bridges 18 and 34 as illustrated in FIG. 1, the circuitry may be implemented as a memory hub (including interfaces to the processor and system memory) and an input/output (I/O) hub (including interfaces to the system bus and secondary bus). In this other configuration, the control logic 100, 102 may be implemented in the memory hub. With the memory and I/O hubs, messages rather than signals may be used to provide the same functionality as the control logic 100, 102. For example, the I/O hub may send a "Prepare for Deep Sleep" message to the memory hub. Alternatively, a serial link may be used for communication with the voltage regulator 52 and dock generator 50.

The power management control logic 100, 102 provides control signals to the voltage regulator 52 to adjust its voltage levels and to the processor 12 to adjust the processor's internal clock frequency. In addition, the power management control logic 100, 102 is responsible for placing the processor 12 into a low activity state to transition the system to a different performance state. Further, the control logic 100, 102 drives a clock control input (e.g., G_STPCLK#) of the processor 12 to perform clock throttling if necessary. Alternatively, internal control registers in the processor 12 may be used to program the performance state of the processor.

A brief description of the interface signals between the power management control logic 100, 102 and the other components of the system follows. A signal VR_LO/HI# is provided by the control logic portion 100 to the voltage regulator 52 to adjust the voltage level supplied by the voltage regulator 52 up or down. A signal G_STPCLK# is provided to the processor 12 and a signal G_CPU_STP# is provided to the clock generator 50 to place the processor 12 in a low activity state (e.g., deep sleep or stop grant state) so that the clock frequency and supply voltage level of the processor 12 may be varied. The low activity state may also be defined as any of the C1, C2, and C3 states under the Advanced Configuration and Power Interface (ACPI) Specification, Revision 1.0, published on Dec. 22, 1996. Further, G_STPCLK# may be used to perform processor clock throttling. A signal LO/HI# provided by the control logic portion 100 to the processor 12 determines whether the core clock frequency of the processor 12 is at a high or low level. As an example, the core clock frequency may vary between 350 MHz and 450 MHz depending on whether LO/HI# is active or not. It is noted that additional signals may be used to adjust the core clock frequency to more than two levels. Similarly, additional signals other than VR_LO/HI# may also be used to control the voltage levels provided by the voltage regulator 52. In the illustrated embodiment, a signal G_LO/HI# from the system bridge 34, indicates the desired system state and controls the states of LO/HI# and VR_LO/HI#.

A signal VRCHGNG# is provided by the control logic 100 to system electronics circuitry (e.g., the host bridge 18 and system bridge 34) to indicate that the voltage level from the voltage regulator 52 is changing. A signal VRPWRGD from the control logic 100 to the system electronic circuit 104 indicates when the output from the voltage regulator 52 is within specification. According to different embodiments, the voltage regulator interface provided by the control logic portion 100 allows the voltage regulator 52 to change settings without causing a power-on reset of the system. As a result, the performance state transition (including adjusting the processor's core clock frequency and voltage level) may be accomplished without resetting the system, which invalidates the system context.

According to one embodiment, when the voltage regulator on signal (VR_ON) is active (which is true whenever the system is on), the voltage regulator 52 settles to the output selected by VR_LO/HI# (a low level or a high level). By way of example, a low supply voltage level may be about 1.3 V while a high supply voltage level may be about 1.8 V. When the outputs of the regulator 52 are on and within specification, the voltage regulator 52 asserts a signal VGATE, which in turn controls the state of the signal VRPWRGD provided by the control logic portion 100 to system electronics circuitry. To prevent a system reset, the signal VRPWRGD is maintained active during the performance state transition by the control logic irrespective of the condition of VGATE.

It is contemplated that when the processor 12 is transitioning from one performance state to another, the voltage regulator output may or may not change, depending on its original level. It is possible that the voltage regulator output level may be valid at both performance states, in which case a voltage level adjustment is not necessary.

Different events may be used to trigger performance state transitions. Environmental changes in the computer system may trigger a performance state change, including an over-temperature condition where a predefined temperature threshold in a thermal zone of the computer system has been violated. In response to the over-temperature condition, the thermal management scheme according to embodiments of the invention is executed. A user (through a graphical user interface) may specify the performance state of the computer system. Other events may include docking or undocking of the computer system 10 and the coupling or discoupling of the external source port 58 to an external power source (such as an AC power source). In addition, system usage may be monitored, with events generated to trigger switching to a lower performance state if usage is low, for example.

Performance state change events may be handled a number of different ways. A device driver may be registered to receive such events, for example. Alternatively, such events may generate an SMI such that an SMI handler is invoked. In addition, A BIOS routine may be used to respond to a generated power event. Other mechanisms are also possible.

Figure 8:
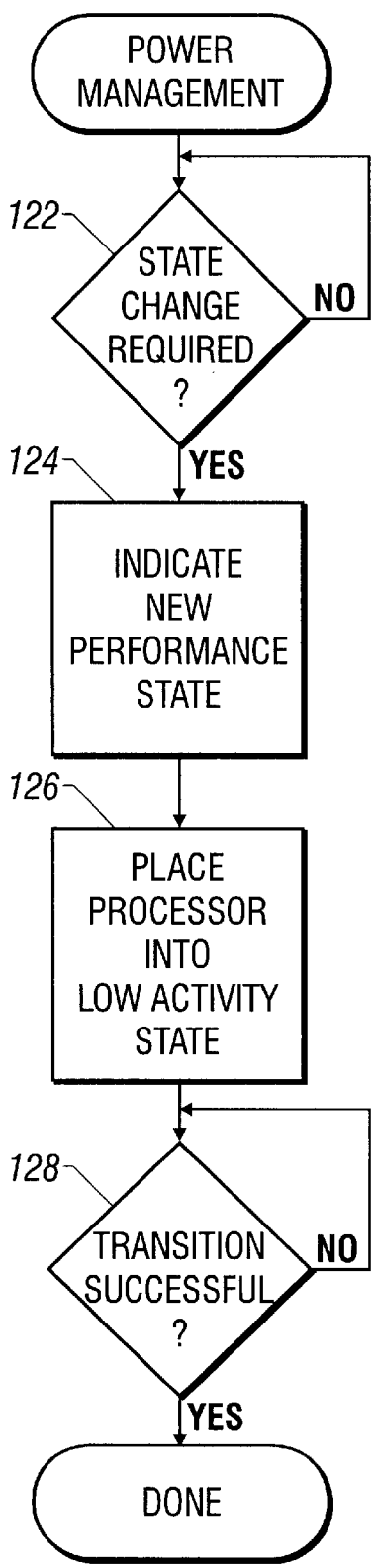
FIG. 8 is a flow diagram of a power management module in the system of FIG. 1.

Referring to FIG. 8, the process executed by a power management module according to one embodiment in the system to control performance state transitions is illustrated. The power management module may be implemented as a software module, in system firmware (e.g., system BIOS or SMI handler), as part of the operating system, as a device driver, or as a combination of the above. The power management module determines (at 122) if a performance state change is required in response to a received event, indicating a thermal event, power supply transition, docking/undocking, a user command, or other event has occurred. The thermal event may be generated by one of the thermal arrangement routines (FIG. 2 or 3) described above. Next, the power management module indicates (at 124) the new performance state of the processor is to transition to. This may be performed, for example, by writing a predefined value to a control register to indicate the new performance state of the processor 12. The control register may be defined in memory or I/O address space. In addition, programming of the control register may be defined under the ACPI Specification. Thus, in one embodiment, one or more ACPI objects may be created to indicate to the operating system that the computer is capable of transitioning between or among different performance states and to denote the resources that may be used by the operating system to perform the transitions. The location and structure of the control register may be defined under an ACPI object. Further, one or more ACPI objects may define the number of performance states available, the core clock frequencies and supply voltage levels to be used in the performance states, the expected power consumption in each performance state, and other information.

Next, the power management module places (at 126) the processor 12 into a low activity state (e.g., deep sleep, stop grant, C1, C2, or C3 state). In the deep sleep state, which may be the C3 state defined under the ACPI specification, the external clock BCLK to the processor is disabled so that no activity is performed by the processor except maintenance of the stored data in the processor's internal cache. In the stop grant or C2 state, the processor performs minimal activity, such as snooping for an internal cache line hit to maintain cache coherency. While the processor 12 is in the low activity state, the performance mode of the processor 12 may be changed by, for example, by changing the core processor clock frequency and adjusting the core voltage level. Once the processor 12 has transitioned to the low activity state, the control logic 100, 102 takes over the performance state transition, as further described below in connection with FIG. 9.

The power management module next determines if the performance state transition was successful (at 128 in FIG. 8). This may be determined by reading a predefined register in the processor 12, which may be a model-specific register (MSR) or the processor's CPU ID register. The predetermined register may be updated by the processor 12 after a transition has been successful. If the transition was successful, then the power management module exits. If unsuccessful, the power management module may time out after a predetermined time period, and a failed indication may be provided.

Figure 9:
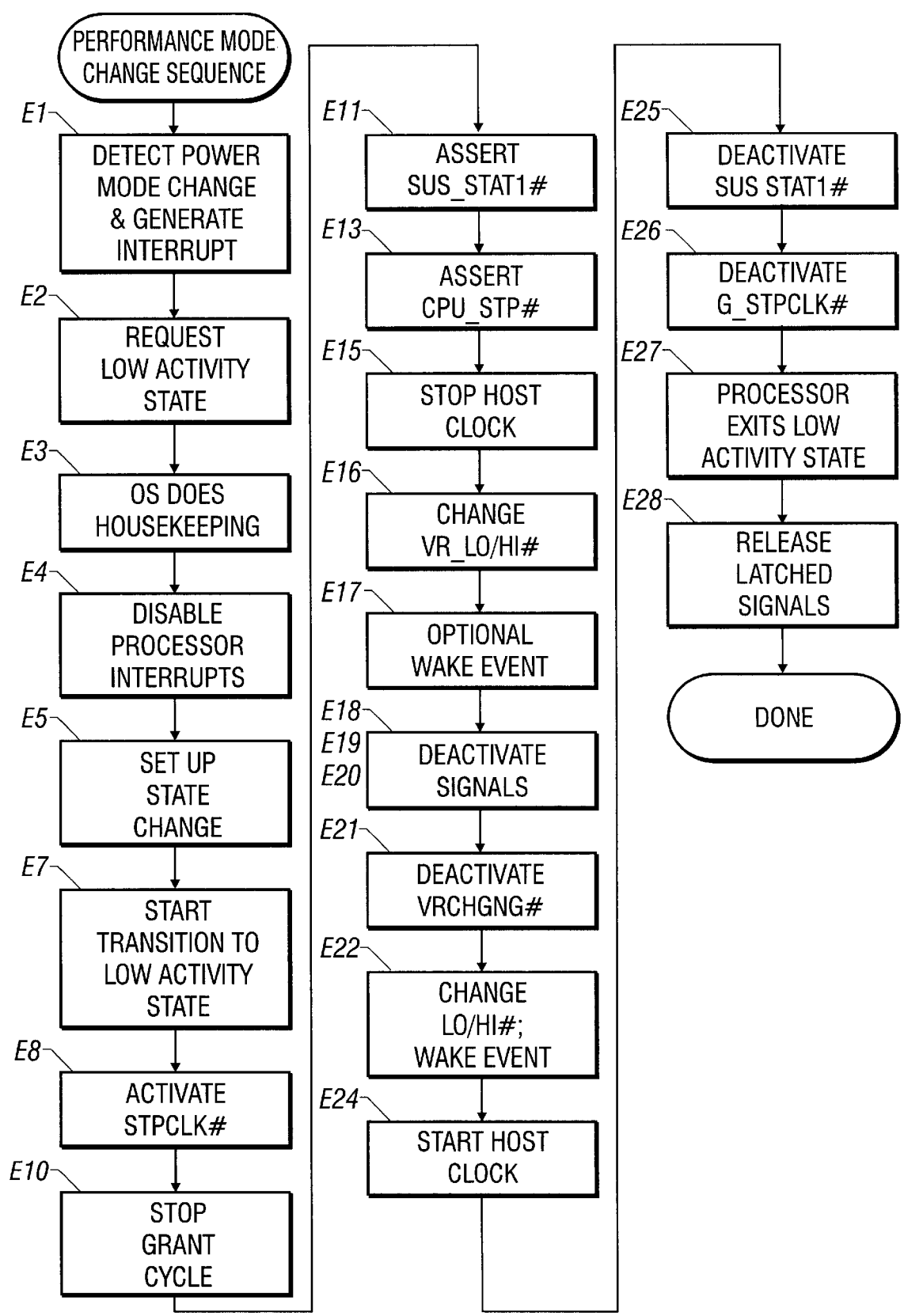
FIG. 9 is a flow diagram of a performance mode change sequence in the system of FIG. 1.

Referring to FIG. 9, the performance state change sequence is illustrated in greater detail. The sequence is performed by a combination of software, firmware, and hardware, including the power management module, the control logic 100, 102, and other modules. It is contemplated, however, that the sequence may be varied and performed by different system modules. Reference is also made to the timing diagram of FIG. 10, which illustrates relative timings of the signals and events involved in the performance state change sequence.

When the system detects a power mode change (such as in response to the power management module writing to the predetermined control register to indicate the new performance state), an interrupt may be generated (at E1), which may be an interrupt defined by the ACPI specification. When the interrupt handler (e.g., an ACPI driver) is loaded, it recognizes the power mode change and, in response, requests that the operating system place the processor into the low activity state (at E2), which in one example may be the ACPI C3 state. Next, the operating system performs system housekeeping (at E3) and gives control of the system to the interrupt handler.

Next the interrupt handler disables the interrupts to the processor 12 (at E4), although interrupts that may be handled by the system bridge 34 are not affected. It is noted that processor interrupts may not be disabled for more than a predetermined time period (e.g., about 200 microseconds) in order for the performance state transition to be seamless. For example, overrun errors on buffered networks or serial ports may occur if the latency caused by the performance state switching is greater than the predetermined period.

Next, the interrupt handler sets up (at E5) the performance state change by performing an I/O write to a register in the system bridge 34 to control the transition of the signal G_LO/HI#. As illustrated at E6 in FIG. 10, this causes the signal G_LO/HI# from the system bridge 34 to change state. Changing the state of G_LO/HI# is an indication to change performance states.

Next, the interrupt handler initiates (at E7) the transition of the processor 12 to the low activity state, which may in one example be performed by the interrupt handler accessing a predefined register in the system bridge 34, such as by performing a memory or I/O read of the level 3 register in the 82371 series of system bridge chips (PIIX3 or PIIX4 chips) from Intel Corporation. In response to the level 3 read, the system bridge 34 activates (at E8) the signal STPCLK# to begin a processor stop clock sequence. This in turn activates (at E9) a signal G_STPCLK# from the control logic portion 100 to the processor 12.

Next, at E10, the processor 12 issues a stop grant cycle in response to detection of the activation of G_STPCLK#. When the system bridge 34 recognizes the stop grant cycle, it asserts a signal SUS_STAT1# (at E11) to the control logic portion 100, which in turn activates a signal G_SUS_STAT1# (at E12) provided to the host bridge 18 that may perform refresh control of system memory 16. In the embodiment in which the processor clock BCLK is disabled, another clock (e.g., a suspend clock) may be needed to perform system memory refresh. Next, the system bridge 34 asserts a signal CPU_STP# (at E13) to the control logic portion 102, which in turn activates a signal G_CPU_STP# (at E14) that is routed to the clock generator 50 and the control logic portion 100. In response to activation of G_CPU_STP#, the clock generator 50 deactivates the host clock (BCLK) at E15. At this point, the control logic portion 100 may latch certain signals which may not be changed during the deep sleep state of the processor 12, such as signals INIT#, INTR, NMI, and SMI# used by the Pentium® family of processors, which are latched as signals G_INIT, G_INTR, G_NMI, and G_SMI# provided to the processor 100. At this point, VRCHGNG# is also activated.

Figure 10:
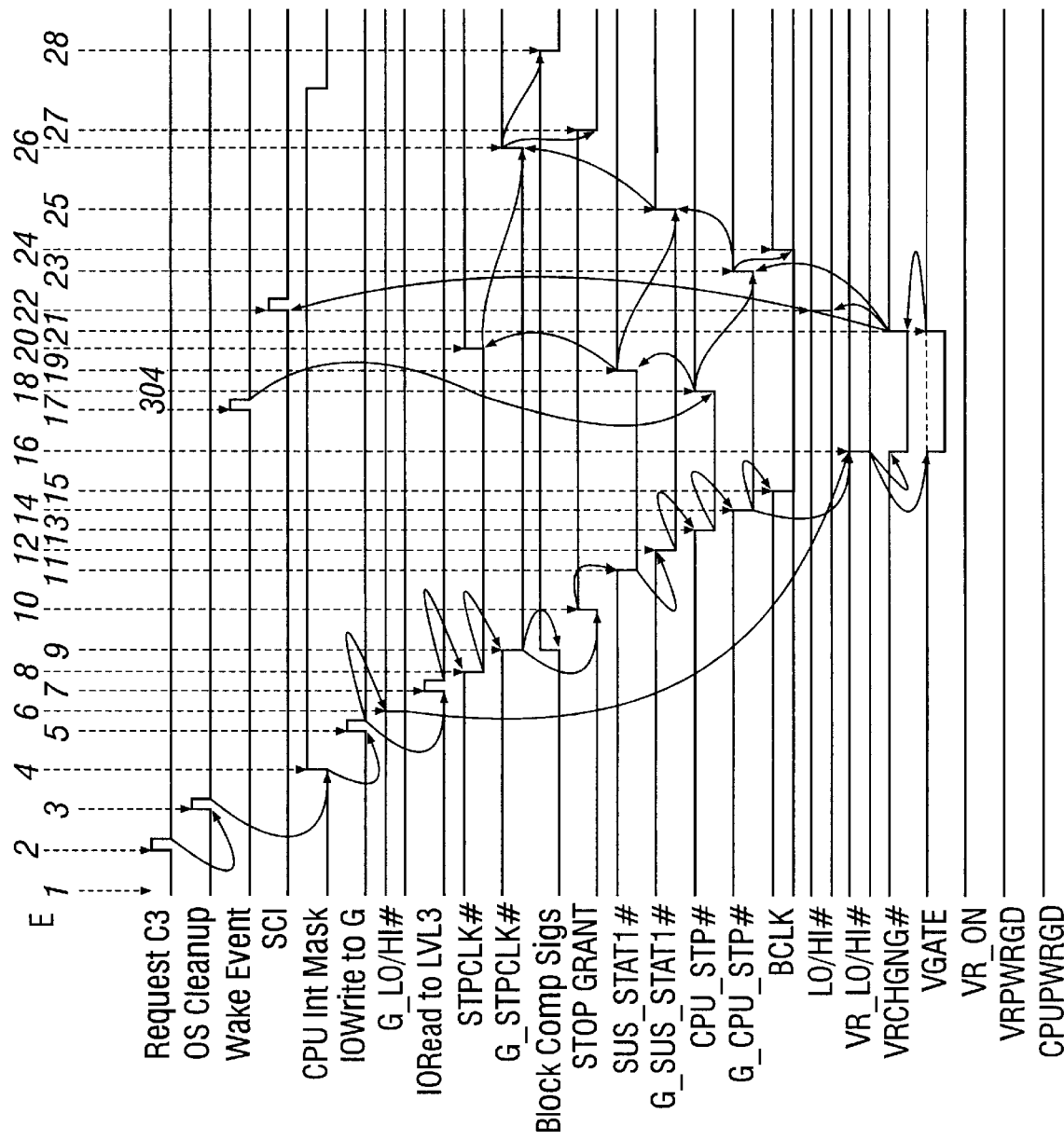
FIGS. 10 and 11 are timing diagrams of signals and events in the performance mode change sequence of FIG. 9.

After a predetermined delay following activation of G_CPU_STP# (e.g., 10 microseconds), the control logic portion 100 changes the state of the signal VR_LO/HI# (if necessary) to begin changing the voltage level of the voltage regulator 52. The predetermined delay is to allow time for the phase locked loop (PLL) circuit in the processor 12 to deactivate. Depending on whether the voltage level of the voltage regulator 52 is within or out of specification, the signal VGATE driven by the voltage regulator 52 may or may not deassert. At this point, the voltage regulator setting is changing, but the processor core clock frequency change does not begin until the voltage level settles. Further, as illustrated in FIG. 10, the power good indications VRPWRGD and CPUPWRGD remain active to prevent system reset.

Next, the interrupt handler may issue an asynchronous wake event (at E18) to initiate system exit from the low activity state. According to an embodiment of the invention, this wake event is optional and may occur any time after activation of G_CPU_STP#. Alternatively, a system controller interrupt (SCI) may be issued to initiate exit from the low activity state. If this is caused by the assertion of VRCHGNG#, the overall latency is minimized. If the wake event occurs at E17, which is before the voltage regulator state change and the core processor clock frequency change have completed, the wake event is blocked by latching certain signals in the control logic 100, 102.

In response to the wake event, the system bridge 34 deactivates the signal CPU_STP# (at E18). However, the signal G_CPU_STP# is maintained latched by the control logic portion 102 to continue in the low activity state. The signals SUS_STAT1# and STPCLK# are also deactivated (at E19 and E20) in response to deactivation of CPU_STP#, but the control logic portion 100 maintains the states of G_SUS_STAT1# and G_STPCLK# latched.

The control logic portion 100 then waits for the signal VGATE to be activated by the voltage regulator 52 (at E21) to indicate that the voltage levels have settled or to wait until a predetermined time period has elapsed (e.g., 100 microseconds) and VGATE is asserted. When either occurs, the control logic portion 100 changes the state of LO/HI# to change the core clock frequency of the processor 12 (at E22) and deasserts VRCHGNG#. By this time, a synchronous wake event (which may be in the form of a system control interrupt or SCI) may be asserted by the system bridge 34 to force the system out of the low activity state. The SCI event is independent of the asynchronous wake event that may be generated at E17. Either one of the wake events may be used. In FIG. 10, generation of the asynchronous wake event at E17 before SCI allows early deactivation of CPU_STP#, SUS_STAT1#, and STPCLK# so that the control logic controls the timing of G_CPU_STP#, G_SUS_STAT1#, and G_STPCLK#.

Next, once VRCHGNG# deasserts to indicate the voltage regulator outputs have settled and if the signal CPU_STP# is inactive, the signal G_CPU_STP# is also deactivated (at E23). When this occurs, the host clock is started by the clock generator 50 (at E24). After the host clock starts, the control logic portion 100 waits a predetermined time period (e.g., greater than 64 microseconds) before deactivating G_SUS_STAT1# (at E25). A predetermined time period after that, the signal G_STPCLK# is deactivated (at E26).

Figure 11:
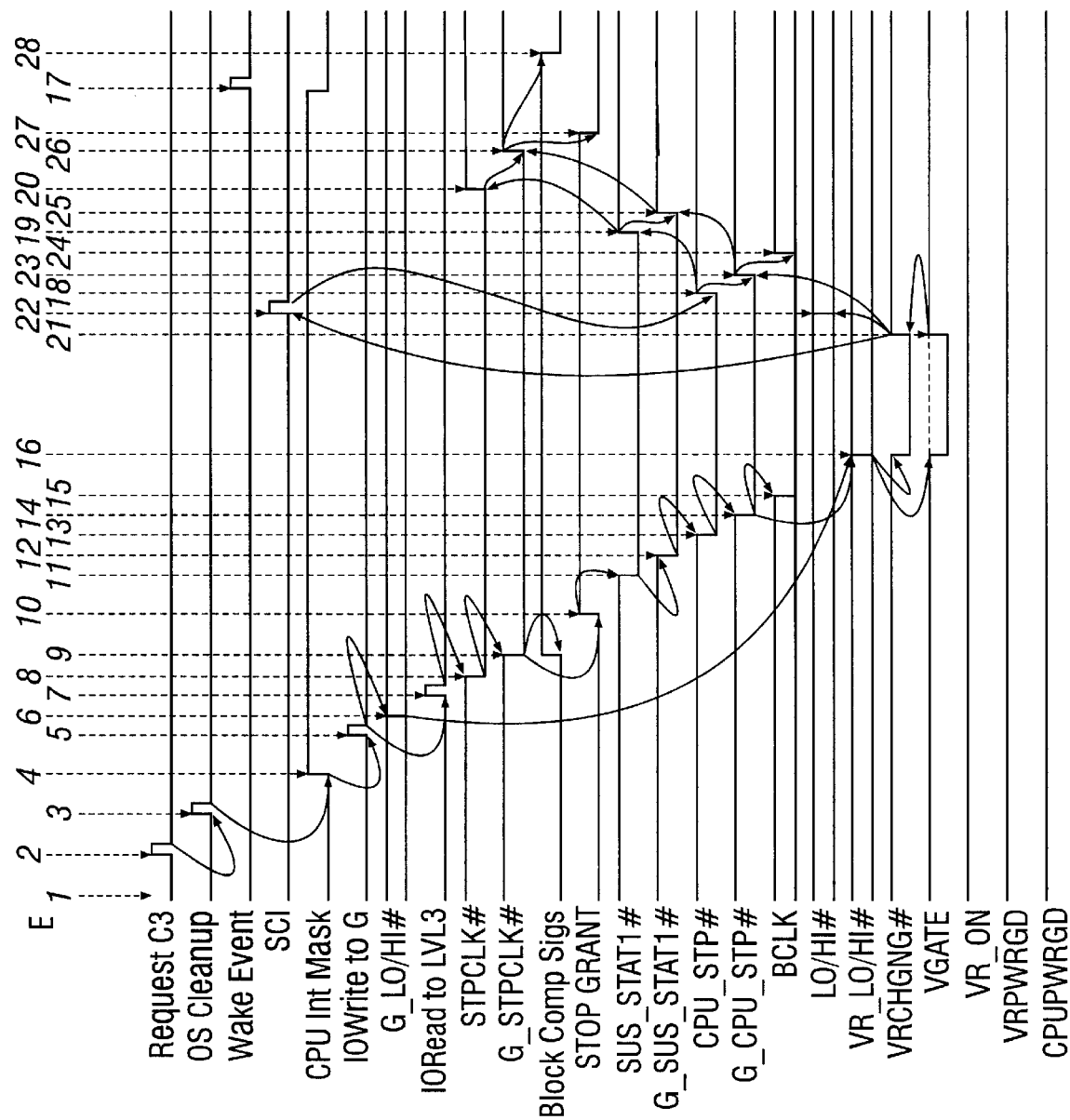

As noted above with reference to FIG. 10, the control logic portion 100 controls the deassertion of the signals G_CPU_STP#, G_SUS_STAT1# and G_STPCLK# since the wake event issued at E17 has already triggered deassertion of the CPU_STP#, SUS_STAT#, and STPCLK# signals. In contrast, in FIG. 11, if the wake event E17 is not issued until much later after the SCI, the interrupt SCI generated at E22 triggers deassertion of STPCLK#, SUS_STAT1#, and CPU_STP#. As illustrated, once VRCHGNG# is deactivated, G_CPU_STP# is not deactivated until after CPU_STP# is deasserted by the system bridge 34 in response to the SCI. Consequently, the sequence of events and signals to wake the processor 12 is changed as shown in FIG. 11.

After the signals G_STPCLK#, G_CPU_STP#, and G_SUS_STAT1# are all deasserted, the processor 12 exits the low activity state (at E27) in the new performance state. Finally the latched signals INIT#, INTR, NMI, and SMI# are released (at E28) and the system is allowed to proceed with normal operations.

After the internal clock frequency and voltage settings have changed, predefined register bits in the processor 12 may be updated that is accessible by software to determine if the performance state change has been successfully made. The predefined register bits may be mapped to a memory or I/O address of the processor 12, the voltage regulator 52, or a combination of both. Alternatively, the predefined register bits may be found in system memory 16.

A thermal management system has been described that controls the temperature of a system by cycling or varying the system between or among different performance states. If necessary, the clock of one or more specified components (e.g., a processor) may be throttled to further reduce power consumption. Throttling is performed after the system has transitioned to a reduced performance state.

Other embodiments are within the scope of the following claims. For example, thermal management may be implemented in hardware. For example, a state machine may periodically monitor the temperature detected by the sensor 15 and transmit notifications to transition the processor 12 between the HP and LP states as well as to throttle the processor 12. Such notifications may be made using an interrupt mechanism such as an SMI or SCI, with an interrupt handler invoked to perform the necessary tasks.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:
   a component having a clock; and
   a thermal management controller adapted to monitor a first condition in the system and to vary the component between different performance states including a lower performance state in response to the controller detecting the first condition,
   the thermal management controller adapted to throttle the clock of the component while the component is in the lower performance state in response to the first condition persisting.

2. The system of claim 1, wherein the different performance states include a second performance state, wherein less power consumption occurs in the lower performance state than in the second performance state.

3. The system of claim 2, wherein a supply voltage of the component is set at a first level in the lower performance state and at a second, higher level in the second performance state.

4. The system of claim 1, wherein the thermal management controller includes an interrupt handler.

5. The system of claim 1, wherein the first condition includes an over-temperature condition.

6. The system of claim 1, further comprising a temperature sensor that causes generation of a notification, wherein the thermal management controller is invoked in response to the notification.

7. The system of claim 6, wherein the notification includes an event defined by an Advanced Configuration and Power Interface Specification.

8. The system of claim 7, wherein the component includes a processor, and the control logic places the processor in a stop grant state to stop the clock of the processor.

9. The system of claim 1, wherein the thermal management controller includes control logic to control activation and deactivation of the clock to perform throttling.

10. The system of claim 1, wherein the thermal management controller is adapted to vary the component between different performance states while the component is set in a low activity state without performing a reset of the component.

11. The system of claim 1, wherein the thermal management controller is adapted to throttle the clock by stopping the clock a percentage of time during a predefined time period.

12. The system of claim 11, wherein the thermal management controller is adapted to throttle the clock by setting a duty cycle to determine the percentage time the clock is stopped.

13. The system of claim 12, wherein the thermal management controller is adapted to vary the duty cycle incrementally.

14. An apparatus to perform thermal management in a system that includes a processor, comprising:
   a sensor to detect a first condition in the system; and
   a controller to vary the system between performance modes including a lower performance mode in response to the first condition detected by the sensor, the controller further to throttle a clock of the processor while the system is in the lower performance mode to reduce system temperature.

15. The apparatus of claim 14, further comprising a higher performance mode, wherein the processor has an internal clock set at a first frequency in the lower performance mode and at a second, higher frequency in the higher performance mode.

16. The apparatus of claim 14, further comprising a higher performance mode, wherein the processor has a supply voltage set at a first level in the lower performance mode and at a second, higher level in the higher performance mode.

17. The apparatus of claim 14, comprising a first performance mode, a second performance mode, and at least one higher performance mode.

18. The apparatus of claim 17, wherein the lower performance mode includes one of the first and second performance modes.

19. The apparatus of claim 14, wherein the first condition includes an over-temperature condition.

20. The apparatus of claim 14, the controller to throttle the clock by stopping the clock a percentage of time in a predefined time period.

21. The apparatus of claim 20, the controller to set a duty cycle to determine the percentage time the clock is stopped.

22. The apparatus of claim 21, the controller to vary the duty cycle incrementally.

23. A thermal management method for a system including a component having a clock, comprising:

monitoring a temperature in the system;

transmitting an indication if the temperature exceeds a threshold temperature;

varying the system between power consumption levels including a lower power consumption level in response to the indication; and throttling the clock from the lower power consumption level to reduce the temperature of the system by stopping the clock a percentage of time in a predefined time period.

24. The method of claim 23, wherein varying the system between power consumption levels includes cycling the system between the low power level and a high power level.

25. The method of claim 23, wherein transmitting the indication includes transmitting an interrupt.

26. The method of claim 25, wherein transmitting the interrupt includes generating a system management interrupt.

27. The method of claim 25, wherein transmitting the interrupt includes generating a system controller interrupt.

28. The method of claim 23, further comprising invoking a thermal management routine to perform the varying and throttling.

29. The method of claim 28, wherein the varying and throttling is performed by the thermal management routine under an Advanced Configuration and Power Interface Specification.

30. The method of claim 23, further comprising:

detecting if the system is at a higher power consumption level in response to the indication; and transitioning the system to the lower power consumption level in response to the indication.

31. The method of claim 30, wherein throttling the clock of the component is performed if the system is detected to be at the lower power consumption level.

32. The method of claim 23, further comprising:

transmitting a second indication if the temperature is below the threshold temperature; and disengaging throttling of the clock of the component in response to the second indication.

33. The method of claim 32, further comprising transitioning the system from the lower power consumption level in response to the second indication.

34. The method of claim 23, comprising monitoring the temperature in one of a plurality of zones in the system.

35. An article including a machine-readable storage medium containing instructions for performing thermal management, the instructions when executed causing a system to:

transition the system between performance states including a first performance state and a second, higher performance state in response to an over-temperature condition; and throttle a clock of a component in the system while it is in the first performance state to reduce temperature in the system.

36. The article of claim 25, wherein the storage medium contains instructions for causing the system to further cycle the system between the first performance state and the second, higher performance state.

37. The article of claim 25, wherein the storage medium contains instructions for causing the system to further detect if the system is in a second performance state in response to the over-temperature condition and to transition the system to the first performance state in response.

38. The article of claim 37, wherein the storage medium contains instructions for causing the system to further detect if the system is in the first performance state in response to the over-temperature condition and to throttle the component's clock in response.

39. The article of claim 35, wherein the storage medium contains instructions to cause the system to further detect if the temperature is below a threshold level and to disengage throttling the component's clock in response.

40. The article of claim 35, wherein the instructions when executed cause the system to throttle the clock by stopping the clock a percentage of time during a predefined time period.

41. A computer data signal embodied in a carrier wave comprising:

one or more code segments containing instructions that when executed causes a system to transition the system between performance states including a first performance state and a second, higher performance state in response to an over-temperature condition; and throttle a clock of a component in the system while it is in the first performance state to reduce temperature in the system, wherein throttling the clock is performed by stopping the clock a percentage of time in a predefined time period.

* * * * *

UNITED STATES PATENT AND TRADEMARK OFFICE
CERTIFICATE OF CORRECTION

PATENT NO.   : 6,535,798 B1
DATED        : March 18, 2003
INVENTOR(S)  : Rakesh Bhatia, Dennis Reinhardt and Barnes Cooper It is certified that error appears in the above-identified patent and that said Letters Patent is hereby corrected as shown below:

<u>Column 18,</u>
Line 23, "25" should be -- 35 --;
Line 27, "25" should be -- 35 --.

Signed and Sealed this

Nineteenth Day of August, 2003

JAMES E. ROGAN
*Director of the United States Patent and Trademark Office*